United States Patent [19]
DaCosta

[11] Patent Number: 4,675,949
[45] Date of Patent: Jun. 30, 1987

[54] AXIALLY ACTUATED HOSE CLAMP

[76] Inventor: Tony R. DaCosta, 1829 Potomac Ave., Ventura, Calif. 93004

[21] Appl. No.: 848,496

[22] Filed: Apr. 7, 1986

[51] Int. Cl.[4] ............................................. B65D 63/00
[52] U.S. Cl. .................................... 24/269; 24/20 TT; 24/279; 24/280
[58] Field of Search ............ 24/269, 279, 280, 20 TT, 24/483

[56] References Cited

U.S. PATENT DOCUMENTS

| | | |
|---|---|---|
| 972,489 | 10/1910 | Adams . |
| 1,282,848 | 10/1918 | Jones ....................................... 24/269 |
| 1,490,618 | 4/1924 | McKinney ............................. 24/269 |
| 2,383,199 | 8/1945 | Kitts ....................................... 24/269 |
| 2,480,755 | 8/1949 | McElroy ................................ 24/269 |
| 2,555,378 | 6/1951 | Shuter . |
| 4,310,956 | 1/1982 | Meckstroth et al. . |

FOREIGN PATENT DOCUMENTS

| | | | |
|---|---|---|---|
| 333329 | 2/1921 | Fed. Rep. of Germany | ........ 24/269 |
| 648162 | 7/1937 | Fed. Rep. of Germany | ........ 24/269 |
| 666873 | 10/1938 | Fed. Rep. of Germany | ........ 24/269 |
| 626701 | 5/1927 | France | ................................. 24/269 |
| 671878 | 9/1929 | France | ................................. 24/269 |
| 707476 | 4/1931 | France | ................................. 24/269 |
| 942009 | 9/1948 | France | ................................. 24/269 |
| 557134 | 11/1943 | United Kingdom . | |
| 558574 | 1/1944 | United Kingdom | ................. 24/269 |

Primary Examiner—Peter A. Aschenbrenner
Assistant Examiner—Laurie K. Cranmer
Attorney, Agent, or Firm—Kenneth J. Hovet

[57] ABSTRACT

A clamp for a hose comprising a drum which is confined for rotation within a clip. The axis of rotation of the drum is aligned with the longitudinal axis of the hose. Bands, which are connected to the clip and encircle the hose, are attached to the drum. A bolt or screw head axially accessible at an end of the drum is rotated by a tool to wind the bands onto the drum and tighten them against the hose. The clip includes latch members that engage gears on the drum to maintain tension on the bands and prevent unwanted backwinding.

15 Claims, 10 Drawing Figures

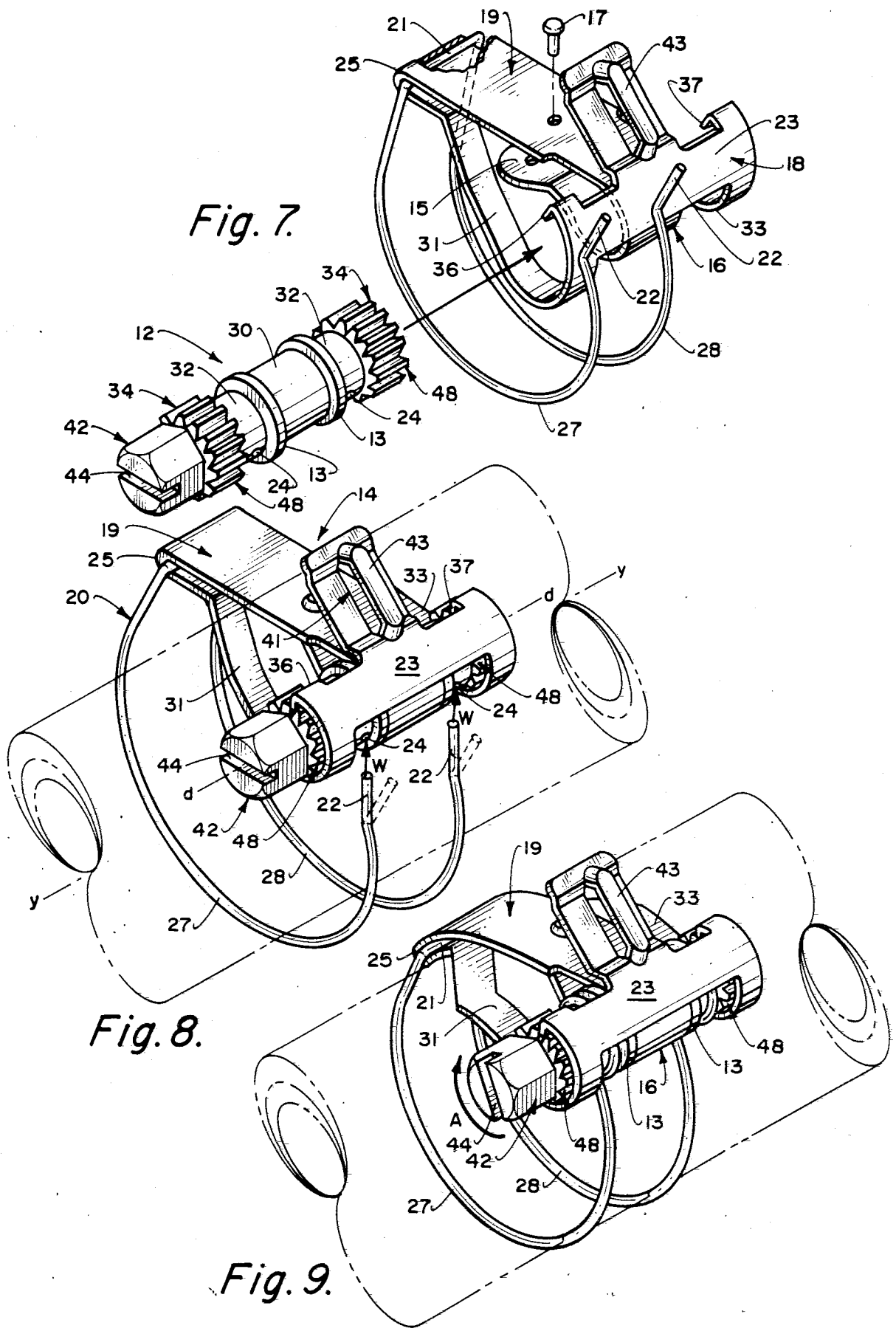

4,675,949

AXIALLY ACTUATED HOSE CLAMP

BACKGROUND OF THE INVENTION

1. Field of the Invention

The present invention relates to devices for securing a hose to a fitting and, more particularly, to a hose clamping mechanism.

2. Description of the Prior Art

Prominent in the hose clamping art are adjustable strap assemblies. In these devices the strap encircles a hose and is tightened by an attached screw mechanism. In U.S. Pat. No. 4,310,956, part of the strap is folded into upstanding ears through which a sheet metal screw extends. When the screw is tightened, the ears converge and draw the strap against the hose.

Although not known to be covered by a patent, probably the most commonly used hose clamp utilizes the threads of a tangential screw. Here, the threads engage slots in the hose strap and cause it to move tangentially about the hose when the screw is rotated.

A different arrangement is shown in U.S. Pat. No. 972,489. Patentee describes a pipe clamp having a strap which is tightened with a screw positioned perpendicular to the axis of the object being clamped. In this device the strap encircles the pipe and extends across opposing saddle bars. Tightening of the screw pushes down on that portion of the strap between the bars and draws the strap up against the pipe.

A major disadvantage of each of the above clamping assemblies is the inability to operate the loosening-tightening screw in a direction parallel to the axis of the hose. This is significant because many times the clamps will be directly adjacent other structures whereby side access to the screw is impossible. It will be appreciated that in such close conditions, it is most likely that the clamp could be accessed by following the longitudinal extent of the hose to the clamp.

Although not addressing the above problem, U.S. Pat. No. 2,555,378 discloses a multi-part clamping device that utilizes a parallel shaft with reverse threads at opposing ends with corresponding follower nuts. Rotation of the shaft will move hinged strap sections about a hose via four linking members.

The essence of the above device is the ability to quickly open and close the clamp with snap-latched strap sections. The parallel alignment of the shaft is an incident of the expander mechanism employed to adjust the degree of tightness of the strap section to the hose. The shaft does not open or close the clamp and no mention is made with respect to its accessibility.

SUMMARY OF THE INVENTION

The present invention provides a significant advancement in the hose clamping art. It utilizes an uncomplicated strap tightening mechanism that is operated from an axis parallel with the hose axis. As so disposed, access to the clamp is substantially insured. Repair work, particularly in the automotive field, is made easier, requires less time, and is more efficient. Costs of repairs to a consumer are significantly reduced.

The invention uses a unique connector means and drum assembly. The connector means holds the drum for rotation so that its axis of rotation is substantially in alignment with the axis of the object being clamped. A strap means is secured to the connector means and encircles the object. It may be releasably attached to the drum.

The drum includes engagement means at least at one end thereof to permit the application of a rotational force via engagement of an implement from a longitudinal direction. A detent and stop means may be included in the assembly to maintain the drum at selected angular displacements.

BRIEF DESCRIPTION OF THE DRAWINGS

FIG. 7 is an exploded perspective view of the clamp assembly of FIG. 1.

FIG. 8 is a perspective view of the clamp of FIG. 1 as it is being assembled about a hose shown in phantom.

FIG. 9 is a perspective view of the clamp of FIG. 1 with the hose shown in phantom.

DESCRIPTION OF THE PREFERRED EMBODIMENTS

Figure 1:
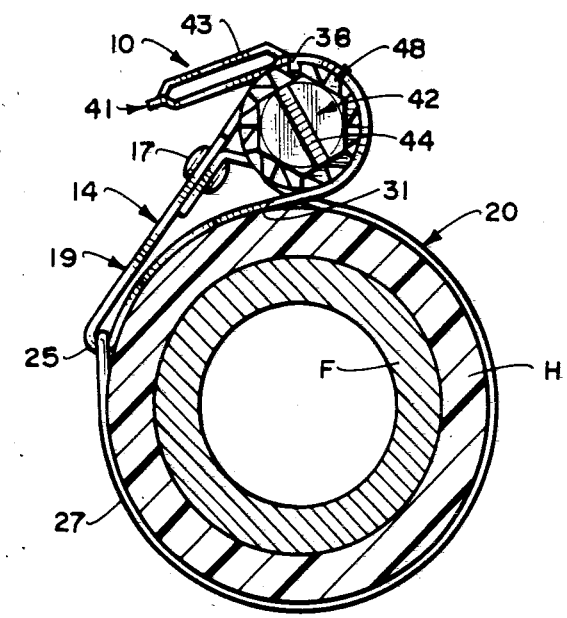
FIG. 1 is an end elevational view of the clamp of the invention tightened about a hose over a fitment which are shown in cross-section.
Figure 2:
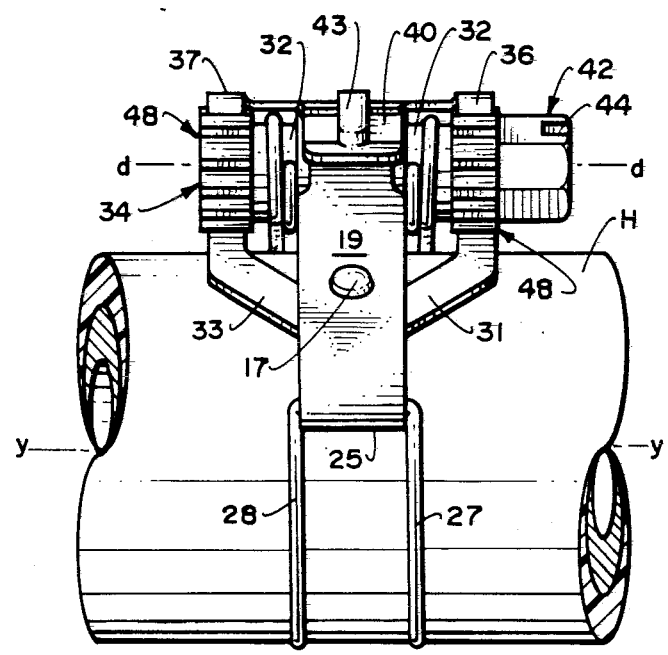
FIG. 2 is left side elevational view of the clamp assembly shown in FIG. 1.
Figure 3:
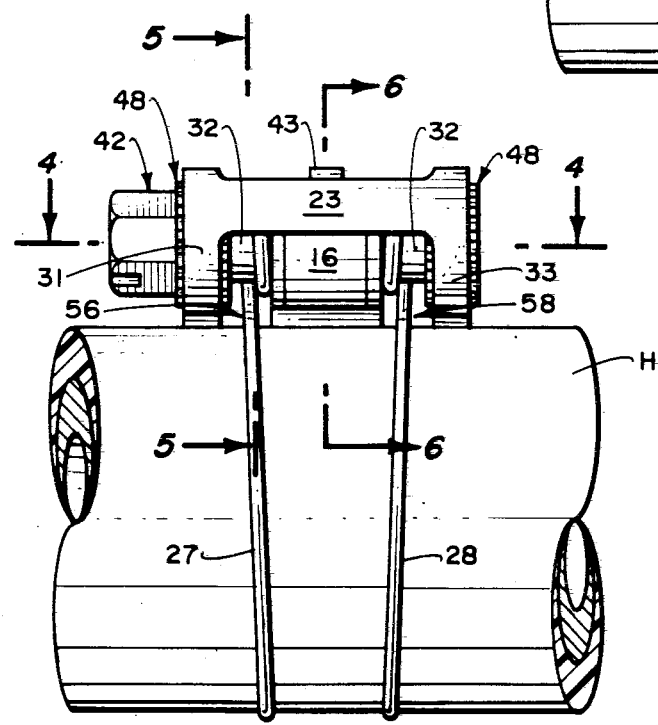
FIG. 3 is a right side elevational view of the clamp assembly shown in FIG. 1.
Figure 4:
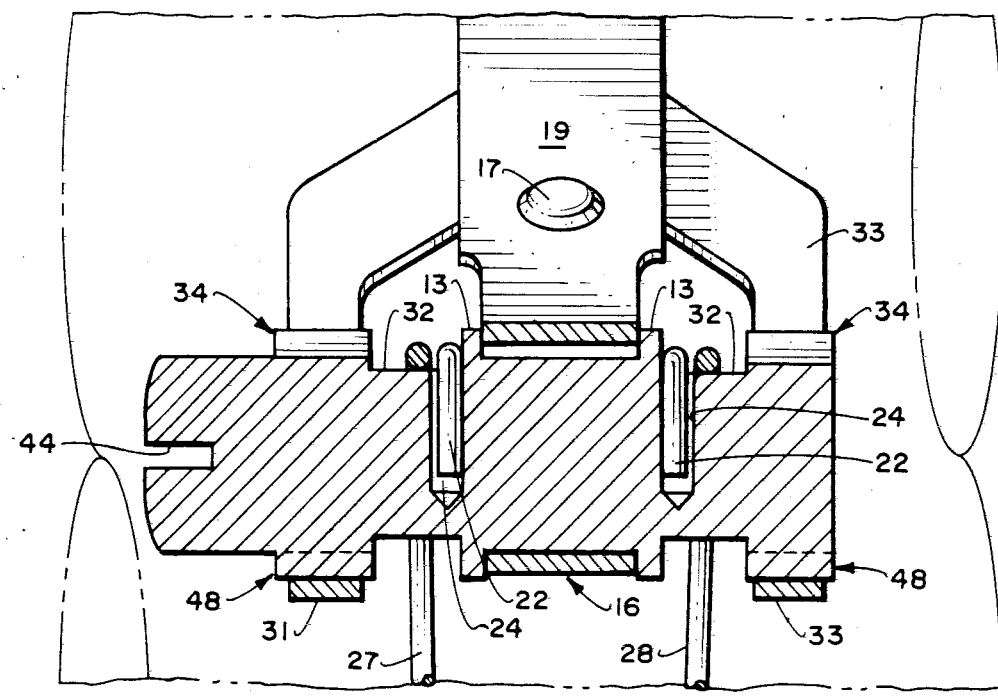
FIG. 4 is an enlarged cross-sectional view taken along lines 4—4 of FIG. 3.

With reference now to the drawings, the overall clamp assembly of the present invention is shown generally by reference 10. In all of the drawing figures except FIG. 7, the clamp is shown encircling a hose H which overlies a tubular fitment F. This is the most common application of the invention. However, as used herein, the word "hose" is intended to have a generic meaning encompassing all manner of elongated objects to which the clamp of the invention may be attached. This includes more than one object wherein the invention may be used to clamp multiple objects together.

The clamp assembly includes a rotatable drum, shown generally by reference 12, held within a connector means shown as resilient strip 14. A first end portion 16 of the strip is looped about the drum with loop end 15 secured by rivet 17 to the strip mid-body portion 19. The looped end fits somewhat loosely about the drum bearing surface 30 defined as the circumferential area between opposing annular ridges 13. This allows free rotation of the drum about its longitudinal axis d,d parallel with the longitudinal axis y,y of the hose.

The strip mid-body portion is bent into a fold 25 from which extend bifurcated strip elements 31,33. These elements diverge to positions proximate to the opposing sides of the mid-body portion and then merge into second end portion 18. The second end portion overlies the first end portion 16 and forms a shield 23 that extends over a radial segment of the drum along a major part of the drum's longitudinal extent.

Extending outwardly from the middle part of the shield is lever 40. The lever is inclined above mid-body portion 19 to facilitate the manual actuation thereof. It may include an optional tool insertion opening 41 formed by offset link 43.

Extending from each opposing side of the shield coextensive with notched wheels 34 are stop means shown as latch members 36,37. Each member is biased against a respective wheel and comprises an integral downturned portion of the shield for releasable engagement with notches 48 in a manner to be hereinafter described.

The above-mentioned fold 25 forms a connection with the mid-section 21 of a strap means shown as elongated flexible member 20. The terminal end of the flexible member is used for connection to drum attachment means.

As shown in the specific embodiment, the flexible member comprises an elongated wire which is bent into a U-shape about its mid-section 21. The parallel legs 27,28 of the wire extending from the mid-section have predetermined lengths dictated by the diameter of object(s) being encircled. They each extend to terminal ends 22 which engage the drum attachment means shown as respective orifices 24. Note arrows W in FIG. 8. It will be appreciated that the elongated flexible member may comprise a strap, cable, rope, or chain which, in each case, would be the functional equivalent of the aforementioned wire.

Outwardly adjacent each of the annular ridges 13 are guide channels 32. Each channel is defined as the circumferential area of the drum axially outward from each ridge and axially inward from detent means shown as opposing notched wheels 34. Preferably, each channel contains an orifice 24 and is recessed with a diameter less than the ridge and notched wheel on each side thereof. In this manner, respective portions 27,28 of the flexible member will be enabled to wind upon each respective channel.

The opposing notched wheels 34 may be formed about the periphery of the drum and be integral therewith. Alternatively, they may comprise separate gear members assembled to opposing sides of the aforementioned guide channels.

As seen in FIG. 7, each wheel includes multiple circumferential radially extending projections. Each projection extends transversly across the wheel face and is beveled toward the direction of rotation.

Figure 6:
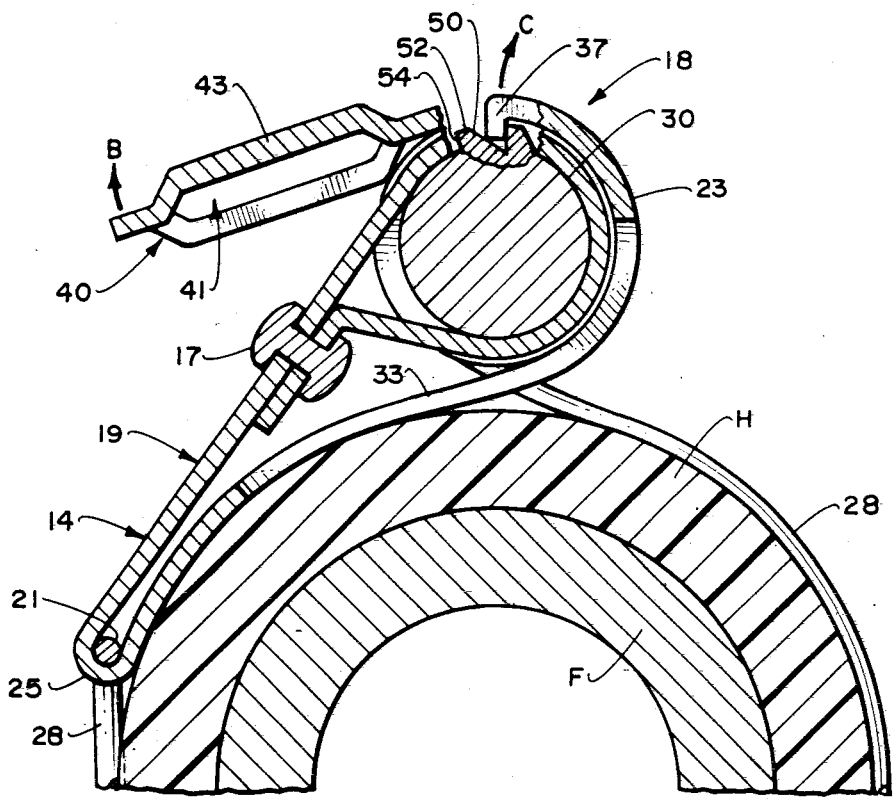
FIG. 6 is an enlarged cross-sectional view taken along lines 6—6 of FIG. 3.

As best seen in FIGS. 1 and 6, each projection includes an inclined face 50 merging into a top surface 52 from which extends a perpendicular abutment face 54. Each successive inclined face extends from the base of a preceding abutment face thereby forming successive notches 48 about the periphery of each wheel.

The number and spacing of the notches will be determined by the size and end use requirements of the overall assembly. Their purpose is to engage the latch members 36,37 of the resilient strip.

At least at one end of the drum is implement engagement means shown as head 42. The head is preferably an integral part of the drum and includes means for permitting longitudinal access of an implement and application of rotational force thereby along an axis coextensive with the hose axis y,y.

As shown, the head comprises a combination engagement structure comprising slot 44 for a screwdriver type of implement and a polygonal shaped circumference for engagement with a wrench or ratchet type of tool. Of course other implements known in the art may be used such as an Allen Wrench in combination with a recessed head structure. The combination being used should be adaptable for longitudinal access.

Figure 5:
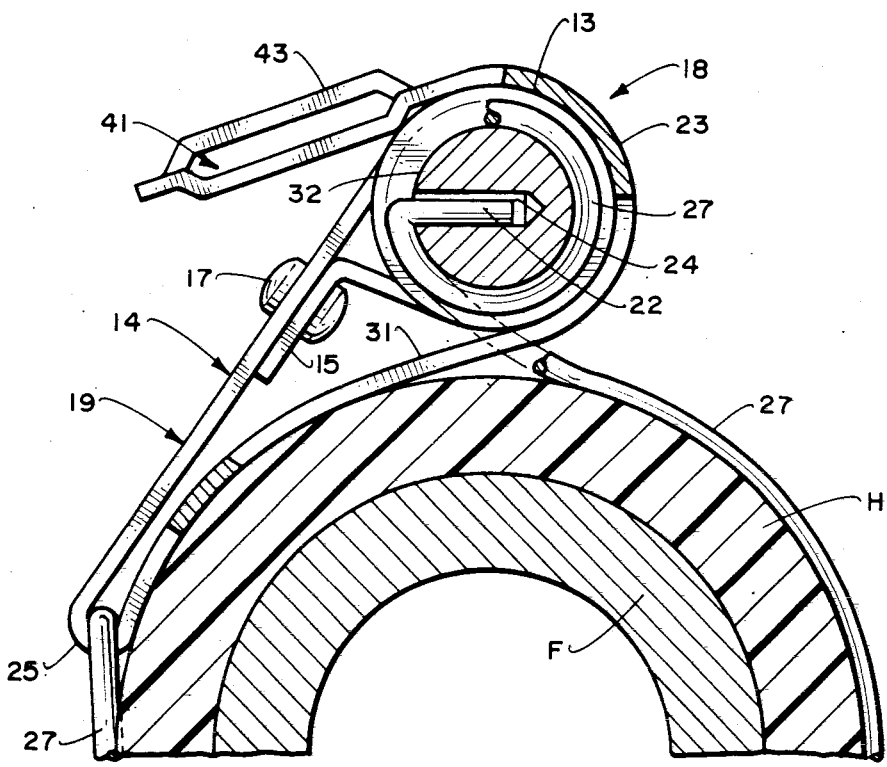
FIG. 5 is an enlarged cross-sectional view taken along lines 5—5 of FIG. 3.
Figure 5A:
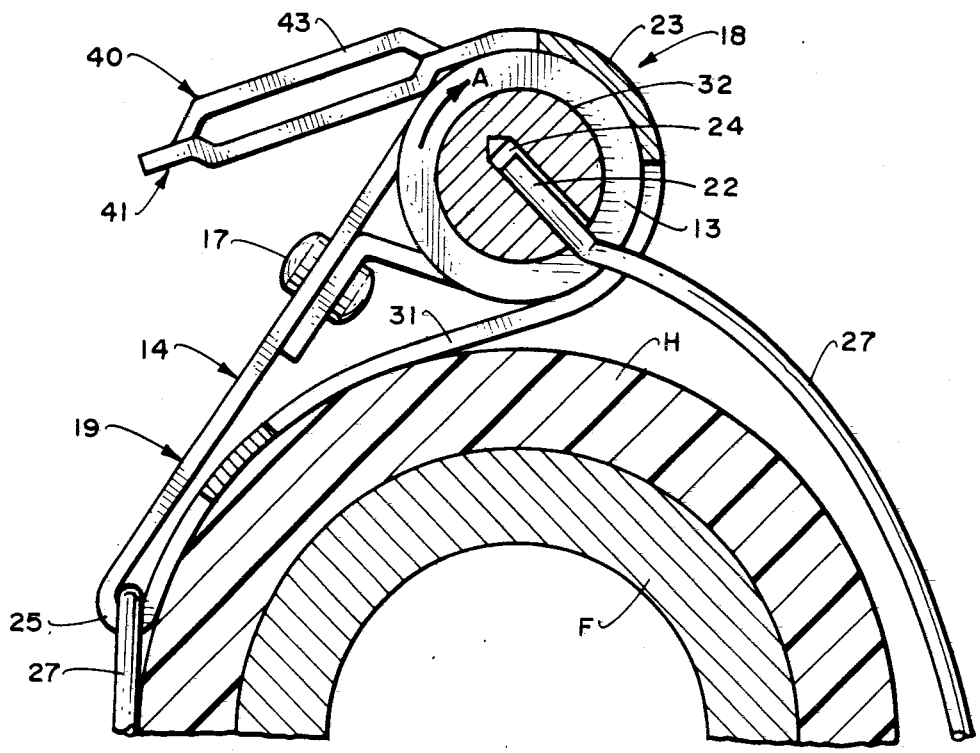
FIG. 5a is the same view as FIG. 5 showing the clamp assembly in a loosened position.

In operation, it is expected that typically, the assembly will, with wire 20 attached at fold 25, be placed against a hose for sealing connection about an underlying fitment. Wire legs 27,28 will be positioned in a manner to encircle the hose. See FIG. 8. Wire ends 22 will be inserted in orifices 24 as shown by arrows W. Note also FIG. 5a. An implement will then be used to engage head 42 and apply rotational force in the direction shown by arrow A in FIGS. 5 and 9. This will rotate the drum and cause the wire legs to wind upon respective guide channels 32.

The strip elements 31,33, being spaced-apart a distance greater than the width of the first end portion 16 and looped end 15, form guide openings 56,58 to thereby direct the wire legs onto each respective channel. The reduced diameter of each channel also facilitates wire direction and permits multiple turns and/or layers of wire thereon.

Winding of the wires upon the channels will diminish their length about the hose and tighten them thereagainst. See FIG. 5. As rotation occurs, latch members 36,37 will slide over successive inclined faces 50 and top surfaces 52. When the desired wire tightness is achieved, rotational force will be stopped. The inherent resiliency of the assembly and hose will cause the drum to rotate backwardly slightly until the latch member engages an abutment face 54. The clamp will thereby maintain its grip about the hose until released.

When one wishes to loosen the clamp and/or remove it from the hose, a slight torque will be applied in the direction of arrow A to the head 42 with the simultaneous lifting of lever 40 in the direction of arrow B shown in FIG. 6. Because the latch members and lever are integral with the shield, movement of the lever will result in a like movement of the shield and latch members. Therefore, lifting of lever 40 causes latch members 36,37 to move out of notches 48 as shown by arrow C in FIG. 6. This will permit the counterclockwise unwinding of the drum and lengthening of the wires to allow their expansion away from the hose circumference. The clamp may then be removed from the hose and/or the hose may be removed from fitment F.

From the above, it is clear that the invention provides a unique axially actuated clamping mechanism which is simple to operate. It is anticipated that the head, notched wheels, guide channels and bearing surface will be a single integral unit with only the resilient strip and wire comprising the second and third parts for assembly. As such, the device will be exceptionally easy to construct. Because it is longitudinally operable, the invention has particular application in the automotive field where multiple hoses are intertwined among crowded mechanical and electrical parts.

While the invention has been described with respect to a preferred embodiment, it will be apparent that other modifications may be made without departing from the scope and spirit of the invention. Accordingly, it is to be understood that the invention is not to be limited by the aforementioned embodiment, but only by the scope of the appended claims.

I claim:
1. A clamp for a hose comprising:
   a drum having detent means and an annular bearing surface;
   a resilient strip having a first end portion looped around said bearing surface for rotatably holding said drum with its axis of rotation substantially in alignment with the longitudinal axis of a hose to be clamped;

a strap means secured to said strip and releasably attached to said drum for being wound thereon; and, implement engagement means on said drum accessible for connection with an implement from a direction parallel to the longitudinal axis of a hose to be clamped, said strip consisting of a singular homogenous structure having a mid-body portion which is folded about said strap means and, spaced-apart strip elements which diverge from the folded mid-body portion to positions proximate respective opposing sides of said mid-body portion and merge into a second end portion, said second end portion positioned over at least a part of said first end portion with a stop means integral with said second end portion comprising at least one latch member extending from said second end portion for releasably engaging said detent means and preventing the rotation of said drum in a predetermined direction.

2. The clamp of claim 1 wherein said detent means comprises notches formed in the circumference of a portion of said drum.

3. The clamp of claim 2 wherein said notches are formed in the circumference of opposing end sections of said drum.

4. The clamp of claim 3 wherein said second end portion has two latch members each in contact with a respective opposing notched end section of said drum.

5. The clamp of claim 4 wherein said strap means is an elongated flexible member that encircles a portion of a hose to be clamped and includes a terminal end.

6. The clamp of claim 5 wherein said drum includes attachment means for releasable engagement with said terminal end.

7. The clamp of claim 6 wherein said drum includes at least one guide channel upon which said elongated flexible member may be wound.

8. The clamp of claim 7 wherein said guide channel includes said attachment means.

9. The clamp of claim 8 wherein the terminal end of said elongated flexible member comprises the opposite ends of a predetermined length of an element selected from the group consisting of wire, cable, rope or chain which is bent at its mid-section for connection with the folded strip mid-body portion, said element having corresponding legs extending from said mid-section about the hose to a respective opposite end.

10. The clamp of claim 9 wherein said drum includes two annular guide channels and corresponding attachment means for releasable attachment with each respective opposite end.

11. The clamp of claim 10 wherein said attachment means comprises an orifice in each of said guide channels for insertion of a corresponding opposite end.

12. The clamp of claim 10 wherein a guide channel is adjacent each opposing side of said annular bearing surface and the notched end sections are outwardly adjacent each corresponding guide channel.

13. The clamp of claim 1 wherein at least one end of said drum includes the implement engagement means.

14. The clamp of claim 13 wherein said implement engagement means comprises any one or combination of a structure selected from the group consisting of polygonal shaped head, recessed head and slotted head.

15. The clamp of claim 1 wherein the second end portion includes an outwardly extending lever for manually flexing said second end portion.

* * * * *